Feb. 8, 1938. S. D. KLAUS 2,107,738
DEVICE FOR VIEWING X-RAY PICTURES AND THE LIKE
Filed Oct. 17, 1936 2 Sheets-Sheet 1

INVENTOR
Sidney D. Klaus
BY Mock, Blum
ATTORNEYS

Feb. 8, 1938.  S. D. KLAUS  2,107,738
DEVICE FOR VIEWING X-RAY PICTURES AND THE LIKE
Filed Oct. 17, 1936  2 Sheets-Sheet 2

INVENTOR
Sidney D. Klaus
BY Mock & Blum
ATTORNEYS

Patented Feb. 8, 1938

2,107,738

UNITED STATES PATENT OFFICE 2,107,738

DEVICE FOR VIEWING X-RAY PICTURES AND THE LIKE

Sidney D. Klaus, Jamaica, N. Y.

Application October 17, 1936, Serial No. 106,078

4 Claims. (Cl. 40—158)

My invention relates to a new and improved device for viewing X-ray pictures or the like, and it applies particularly for use in viewing radiographs in dental or surgical work.

One of the objects of my invention is to provide simple and convenient means whereby an entire series of radiographs, which can correspond to the entire set of teeth of a patient, or any desired number of said teeth, can be viewed by simple and inexpensive apparatus. The invention provides simple and convenient means whereby a single X-ray film or an entire series of such films can be placed conveniently for the use of the surgeon and the patient.

Another object of my invention is to provide a device whereby the radiographs of a number of teeth or the like can be assembled on a common mount, and said mounts can be conveniently assembled with other apparatus, in order to view the radiographs. Since the entire set of radiographs is held on a single mount, this facilitates the storing and indexing of such mounts. Likewise the mount makes it possible to assemble as many as twenty films on a single mount and additional films can be attached to said mount, so as to continue the history of a particular case.

Another object of my invention is to provide means which can be readily adjusted relative to a lamp or other source of light, for viewing the radiographs.

Other objects of my invention will be set forth in the following description and drawings which illustrate certain preferred embodiments thereof, it being understood that the above statement of the objects of my invention is intended generally to explain the same without limiting it in any manner.

Figure 4:
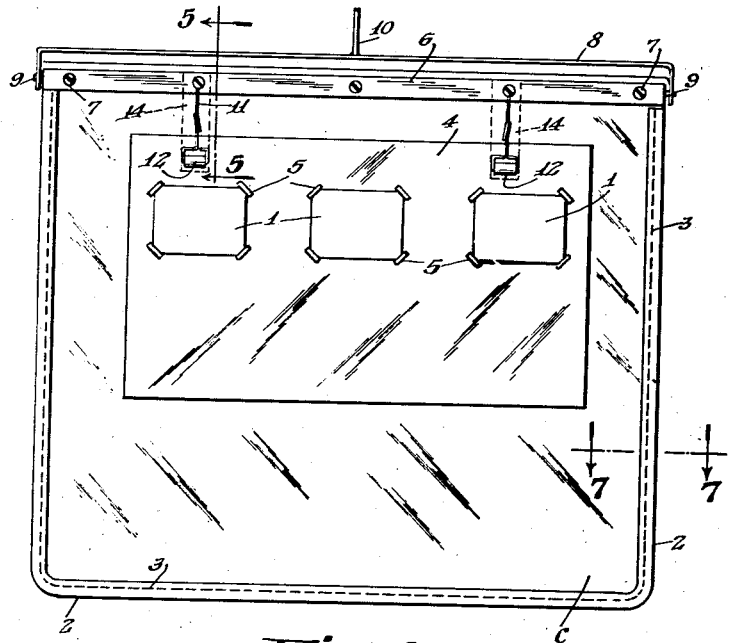
Fig. 4 is an elevation illustrating the mount for the series of radiographs, together with the viewing device, and it is taken on the line 4—4 of Fig. 1.

Referring to Fig. 4, this shows a series of radiographs 1, which are held to a mount 4, which can be made of any suitable translucent or transparent material. Said material is preferably flexible and non-breakable, and the mount 4 may be made of "Celluloid" or other suitable material. I do not wish to exclude the use of a rigid glass mount, although I prefer to use a mount made of the above mentioned non-breakable material.

An entire series of radiographs corresponding to the teeth of a particular patient can be held on the front surface of the mount 4 by any suitable means. In Fig. 4 I have shown strips of adhesive tape 5, which are connected by means of any suitable adhesive to the front surface of the mount 4, and to the corners of the radiographs 1. The mount 4 and the radiographs 1 thus form a permanent assembly, although the strips of tape 5 and the radiographs can be removed from mount 4.

Figure 8:
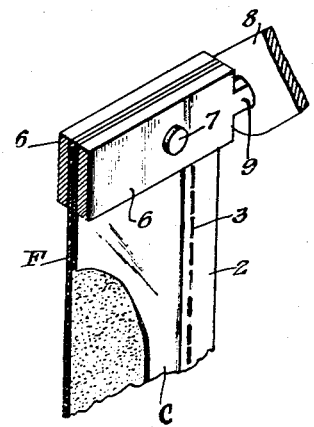
Fig. 8 is a partial perspective view, showing the frame and the accessory viewing device which is held thereby.

Referring particularly to Fig. 8, this shows a sheet of transparent and flexible and non-breakable material C, which is preferably made of clear and transparent "Cellophane". This material is preferably non-inflammable and any material of this type can be utilized.

This is associated with a sheet F made of translucent material. This sheet F may consist of transparent "Cellophane" having one of its surfaces ground or frosted, so as to provide a matte surface. Said sheet F is light-permeable, so that it permits the transmission of light through the same. I prefer to have the sheet F provided with a single matte surface, said matte surface being directly adjacent to and in contact with the companion sheet C.

The sheets C and F are held in a frame which consists of bars 6, made of metal or any other suitable material, and said bars are held so as to clamp the sheets C and F, by means of a series of screws 7.

Figure 5:
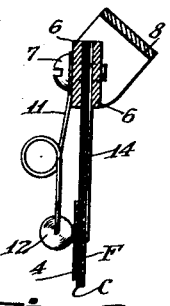
Fig. 5 is a sectional view on the line 5—5 of Fig. 4.

As shown in Fig. 4 and in Fig. 5, holding springs 11 are connected to some of said screws 7. These springs 11 have rollers 12 at their bottom ends, so that the mount 4 can be clamped against sheet C by means of said rollers 12. In order to stiffen the flexible sheets C and F, each of the springs 11 is associated with a member 14 made of rigid metal or other suitable material, which is also held by means of the clamping bars 6. As shown in Fig. 5, the screws 7 can pass through the sheets C and F and through the reinforcing members 14.

The mount 4 is therefore clamped between the members 14, the sheets C and F, and the rollers 12.

Figure 6:
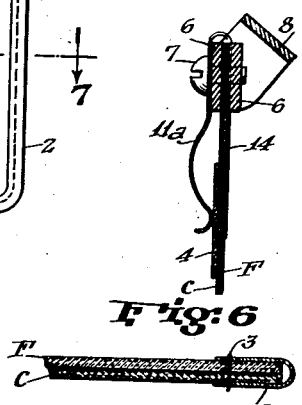
Fig. 6 is a sectional view similar to Fig. 5 and showing a modification of the invention.
Figure 7:
Fig. 7 is a sectional view on the line 7—7 of Fig. 4.

Fig. 6 is substantially the same as Fig. 5, save that I have substituted flat blade springs 11a for the springs 11 shown in Fig. 5, and I have omitted the rollers 12.

The bottom edges and the vertical edges of the sheets C and F can be connected in any suitable manner. For this purpose, and as shown in Fig. 6, I prefer to use a channel-shaped edge-strip 2, which can be made of leather or any other suitable flexible material, and said edge strip 2 is connected to the edge portions of the sheets C and F, by means of stitches 3.

Figure 1:
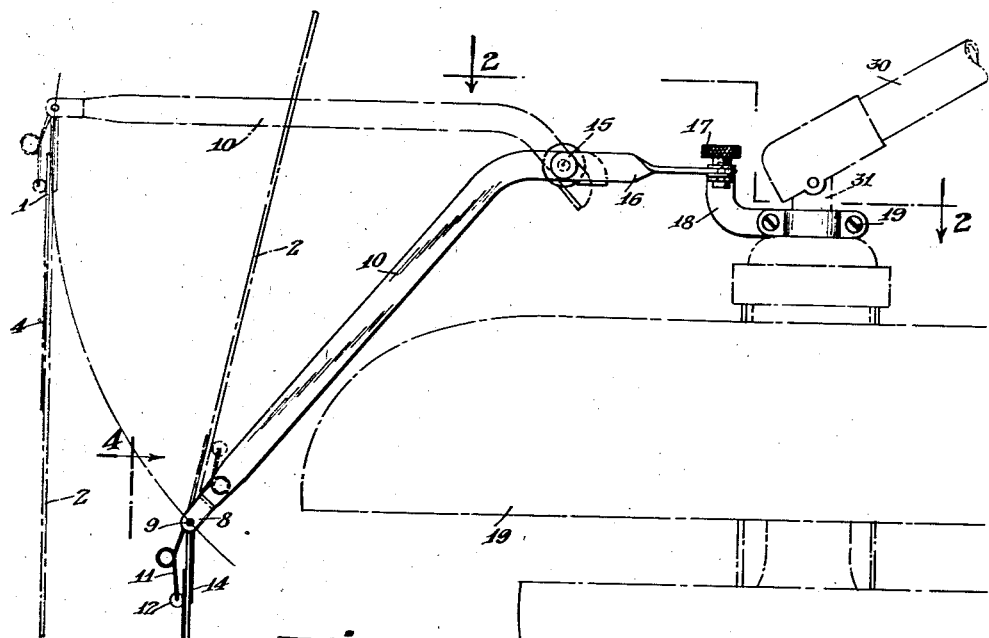
Fig. 1 is an elevation showing the improved apparatus.

As shown in Fig. 8 for example, the bars 6 are provided with projecting lugs 9, which are turnably located in the openings of a bracket 8, which has a projecting bent rod 10. As shown in Fig. 1 and in Fig. 2, the upper or outer end of the rod 10 is pivotally connected by means of a pivot screw 15, to a rod 16.

A clamp 18 is pivotally connected to the rod 16, by means of a pivot screw 17. The clamp 18 consists of two metal members or the like, which are connected by means of screws 19, and which clamp the stud 31 of a suitable lamp. This lamp is supported in any convenient manner, so that the entire apparatus is supported from the lamp. For example, in Fig. 1 I have shown a lamp structure of the ordinary kind, having an upper reflector or shade 19, and having a lower bowl 20, made of any suitable light-permeable material.

Said lamp structure is provided with the usual supporting arm 30, which may be connected to a wall-bracket or the like. Fig. 1 shows how the bars 6 can be turned upwardly from the full-line position shown in Fig. 1, together with the sheets C and F, this position being indicated in broken lines in Fig. 1.

Fig. 1 also shows how the rod 10 can be turned upwardly around the pivot screw 15, this position being also indicated in broken lines in Fig. 1, while the sheets C and F hang horizontally. The adjustment of the parts makes it possible to vary the intensity of the light through different sections of the mount, without using a rheostat for this purpose to control the supply of current to the lamp. The adjustability of the viewing frame makes it possible to change the distance between the source of light and any selected part of the mount which is located on the frame.

Hence the device can be permanently attached to the stud of the lamp, and the parts of the device can be located in the full line position shown in Fig. 1, when it is desired to view the radiographs. When the device is not in use, the frame 6 can be turned upwardly so that the sheets are in the broken-line position shown in Fig. 1. Likewise and if desired, the rod 10 can be turned upwardly to the broken-line position shown in Fig. 1, so that the entire apparatus is out of the way of the shade or reflector 19.

Figure 2:
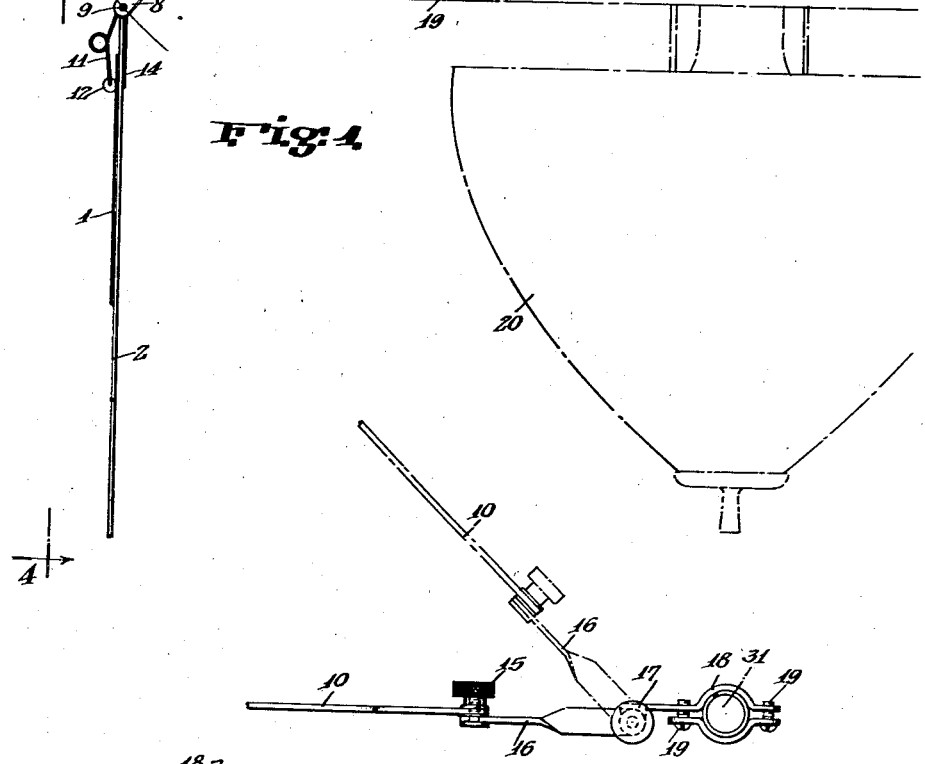
Fig. 2 is a plan view on the line 2—2 of Fig. 1.
Figure 3:
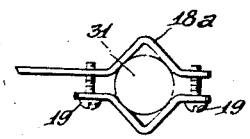
Fig. 3 is a plan view illustrating a modification of the means for holding certain parts of the device to the lamp.

Fig. 3 shows a type of clamp 18a which is substantially the same as the clamp 18 of Fig. 2, save that the clamping members shown in Fig. 3 are of angular shape, instead of having the arcuate shape shown in Fig. 2.

Figure 9:
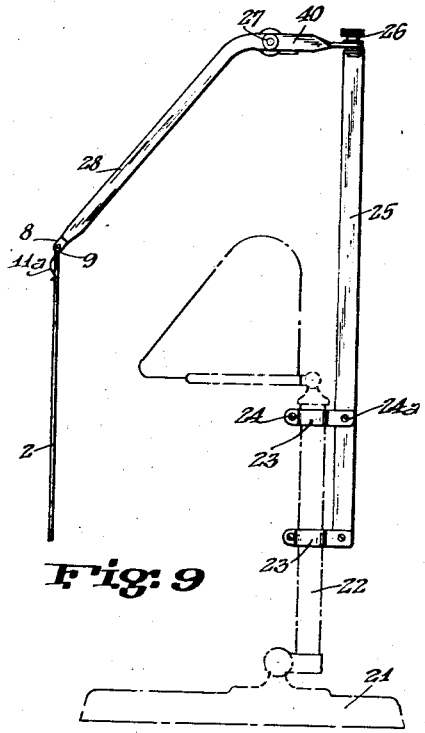
Fig. 9 is an elevation illustrating another modification of the invention.

Fig. 9 shows the device associated with a desk lamp, instead of with the wall lamp which is shown in Fig. 1. Fig. 9 shows an ordinary desk lamp having a base 21, and an upright 22. A rod 25 is adjustably connected to the upright 22, by means of pairs of clamping collars 23 which are connected to each other by means of screws 24. These clamping collars 23 are connected by other screws 24a to the rod 25. A rod 40 is turnably connected to the top of the upright 25 so as to turn in a horizontal plane, by means of a pivot screw 26, and a rod 28 is connected to the rod 40, by means of a horizontal pivot screw 27. It is to be understood that whenever pivot screws or the like are specified, that the same can be tightened, so as to hold the associated parts in fixed adjusted relative position.

Bracket 8 can be turnably connected by means of members 9, to the rod 28. Hence the rod 28 is similar in structure and in function to the member 10 which is shown in Fig. 4, and the member 40 is identical with the member 16.

The same parts which are shown in Fig. 1 can be used in the embodiment of Fig. 9.

The exposed surfaces of the "Cellophane" sheets F and C are smooth and they do not pick up grease or the like. The matte surface of sheet F is protected by sheet C.

This device makes it possible permanently to assemble a set or sets of radiographs on a cheap mount 4, which does not have a matte surface and to examine the set of radiographs with great ease, by means of the auxiliary parts, which can be permanently connected to a lamp, without interfering with the emission of light from said lamp.

The trade name "Cellophane" generally designates a cellulose product which is made by coagulating a solution of cellulose xanthate, in water and caustic soda, and regenerating the cellulose which is thus secured, by means of mineral acids. I prefer to use the moisture-proof type of said product.

The sheets C and F are preferably flexible so that they are freely bendable. However, they have enough adherent rigidity so that said sheets normally assume planar shapes.

I have shown preferred embodiments of my invention but it is clear that numerous omissions and changes can be made without departing from its spirit.

I claim:

1. A device for viewing radiographs, comprising a first and transparent and flexible sheet, a second and translucent and flexible sheet having a single matte surface, rigid means applied only to parts of said sheets and holding said sheets in contacting relationship and with said matte surface of the second sheet in contact with the adjacent surface of the first sheet, clamping means connected to said rigid means adapted to hold a radiograph mount to the outer surface of one of said assembled sheets.

2. A device for viewing radiographs, comprising a first and light-permeable and flexible sheet, a second sheet which is translucent and flexible, the second sheet having a single matte surface, a rigid frame clamping said sheets in contacting relationship and with said matte surface of the second sheet in contact with the adjacent surface of the first sheet, said rigid frame extending around only a part of the edge portions of said assembled sheets, a flexible edge strip connecting other edge portions of said assembled sheets, and clamping means connected to said frame and operative to clamp a radiograph mount to the exposed surface of one of said sheets.

3. A device for viewing radiographs, comprising a first and light-permeable and flexible sheet, a second sheet which is translucent and flexible, the second sheet having a single matte surface, a rigid frame clamping said sheets in contacting relationship and with said matte surface of the second sheet in contact with the adjacent surface of the first sheet, said rigid frame extending around only a part of the edge portions of said assembled sheets, a flexible edge strip connecting other edge portions of said assembled sheets, and clamping means connected to said frame and operative to clamp a radiograph mount to the exposed surface of one of said sheets, a bracket to which said frame is pivotally connected, and supporting means adjustable in a horizontal plane and in a vertical plane.

4. A device for viewing radiographs, comprising a first and light-permeable and flexible sheet, a second sheet which is translucent and flexible, the second sheet having a single matte surface, a rigid frame adapted to clamp said sheets in contacting relationship and with said matte surface of the second sheet in contact with the adjacent surface of the first sheet, said rigid frame extending around only a part of the edge portions of said assembled sheets, a flexible edge strip connecting other edge portions of said assembled sheets, and clamping means connected to said frame and adapted and operative to clamp a radiograph mount to the exposed surface of one of said sheets, said frame having projecting lugs at the ends thereof, a bracket in which said lugs are pivotally mounted, said bracket having a first rod rigidly connected thereto, a second rod to which the first rod is pivotally connected, and a supporting device to which the second rod is pivotally connected, said first rod and said second rod being respectively turnable in vertical and in horizontal planes, and means for holding said rods in adjusted position.

SIDNEY D. KLAUS.